Patented Mar. 7, 1939

2,149,979

UNITED STATES PATENT OFFICE 2,149,979

DYEING OF MINERAL MATERIALS

Anderson Pace, Jr., Ithaca, N. Y., assignor to The Lehon Company, Chicago, Ill., a corporation of Illinois No Drawing. Application October 28, 1937, Serial No. 171,479

9 Claims. (Cl. 8—8)

The invention relates to the dyeing of siliceous materials, as for example, asbestos and the like, and has for its primary object to provide an improved method wherein the fibers are first treated for separating the fibers and which prepares them for dyeing.

A further object resides in the provision of a method for dyeing asbestos by precipitating a color pigment thereon and which utilizes impurities in the asbestos fiber to produce the precipitation of said pigment.

The difficulties heretofore encountered in attempts to dye asbestos have been due principally to the inability of the color to adhere to the asbestos fibers. It is well known as a result of microscopic study of previous attempts that dyes adhere very poorly, if at all, to asbestos fibers. Also it has been difficult to secure complete penetration of the dyes through the clusters of fibers, which is of course necessary for complete and uniform dyeing. By the method of the present invention the asbestos fibers are separated into their integral parts and thus ordinary dyeing with organic dyes is facilitated since each individual fiber surface is available to the dye solution. Also the present method facilitates ordinary dyeing by preparing the surfaces of the asbestos fiber in such a manner that organic dyes will adhere more completely and more uniformly thereto.

The method of the present invention contemplates soaking or boiling the fibers in an acid solution. It is believed that there is an attack on the surface of the fibers as a result of the acid washing thereof. Possibly there is a general roughening or pock-marking or perhaps a local gel of silica is formed since asbestos is a hydrous magnesium silicate. Whatever action takes place, it is definitely established that organic dyes will adhere better and cover the surface of the fibers almost to perfection after such a treatment. The acid attack above described is readily demonstrated by evaporation of a solution of strong acid in which the asbestos has been soaked. Heating of such a solution tends to gel the solution of silica. Therefore, since the preparation of the asbestos fibers for dyeing consists of heating the asbestos to a boil in an aqueous acid solution, it would seem that a local gelation at the surface of the fibers is effected. This in turn is receptive to dyes and also to precipitated pigments. Impurities in the mass of fibers may simultaneously be removed by this treatment and thus aid the process.

Some iron is present in all native asbestos as an impurity. Since the acid treatment described renders the asbestos fibers receptive to organic dyes and also pigments, an important feature of the invention resides in utilizing the iron impurity for precipitating a pigment. The form of iron present in the native asbestos is unimportant for the present process unless it is a sulphide or such other form as would cause the color compound, Prussian blue, to be destroyed chemically. The pigment is precipitated by adding a soluble ferrocyanide to the acid solution and which can be added either at the start of the acid treating process or during the process. More particularly the present invention contemplates the addition of potassium ferrocyanide which produces the precipitate Prussian blue. Thus when the mixture of fiber and acid solution, having added thereto potassium ferrocyanide, is boiled, there is a simultaneous preparation of the fiber surfaces, separation of the fibers and precipitation of iron as Prussian blue. The fiber surfaces are in condition to receive the same, and a very even and firm coating of color is applied to the surface of the fibers.

When the asbestos is treated with the acid solution having the ferrocyanide added thereto the acid separates the fibers and attacks the fiber surfaces. Simultaneously it takes into solution what iron salts it will. This process is only momentary because the ferrocyanide is ready immediately to precipitate the iron present in ferric form as Prussian blue. The relatively slow solution of iron combined with its immediate precipitation as color at the points on the fibers where the iron has been obtained gives a rapid and finely divided precipitation of the Prussian blue. It is precipitated presumably at those exact points where the acid has most greatly attacked the fibers and therefore best prepared them for this precipitation. Perhaps this treatment prepares the fibers in such a way as to give them the property of adsorbing the finely divided color.

When the ferrocyanide is added after the acid treatment approximately the same action takes place except that the color is precipitated at a greater distance from the fibers and precipitates as large particles. For the acid solution hydrochloric is preferred. The amount of potassium ferrocyanide added to the acid solution or used separately is chemically equivalent to the quantity of iron present in the asbestos in a ferric state.

Specifically, about three per cent of iron in the ferric form is usually present in asbestos which is sufficient to give excellent coloring. Some ferrous iron is also present. This may be utilized by the addition of a small amount of nitric acid to the solution for oxidizing the ferrous iron to the ferric form, in which form it will be precipitated as Prussian blue. The addition of nitric acid also serves to decrease the solubility of the Prussian blue in the hydrochloric acid. This increases the available amount of color. In using the present method for preparing the fiber for ordinary dyeing it is not necessary that the acid be washed out of the asbestos fiber prior to the application of the dyes thereto. This, however, is governed by the organic or inorganic coloring used. The acid strength may also be varied but it is found that about a thirty per cent solution of concentrated hydrochloric acid gives very good results. Also for decreasing the solubility of Prussian blue other acids in addition to nitric acid, for example, sulphuric acid, may be used. Adequate preparation of the fibers is secured by boiling in a thirty per cent solution of concentrated hydrochloric acid for about twenty minutes. A longer or shorter time is possible but fiber shortening usually results from prolonged heating because of cracks and fractures in the individual asbestos crystals.

A different coloring of the asbestos fibers can be obtained by causing the precipitation of pigments other than Prussian blue. One variation of the above described process consists in reducing all available iron to the ferrous form by such a method as shaking mercury or finely divided tin with the acid solution and asbestos before or after the addition of the iron-cyanide. In this instance, however, the cyanide compound added is the ferricyanide instead of the ferrocyanide. The color resulting is known as Turnbull's blue. If the amount of mercury or tin is limited so that not all the iron is reduced Prussian green results. Needless to say by varying the amount of iron reduced the shade of green may be varied.

To precipitate such color as lead or barium-chromate it is only necessary to add the requisite lead, barium and chromate in a soluble form, taking precautions to get a finely divided precipitate. These two pigments typify the method when pigments other than iron pigments are desired.

Iron could be precipitated in other colored forms as the hydroxide or phosphate, but the results are less satisfactory. In the case of phosphate only enough soluble phosphate as is needed to precipitate the iron may be added or the acid used may be phosphoric instead of hydrochloric. Nitric acid might also be used instead of hydrochloric. Any of the strong mineral acids will prepare the fibers but sulphuric or phosphoric would be inadvisable when the iron cyanide method is contemplated.

In the basic process above described acid was mentioned as a means of decreasing the solubility of the Prussian blue in the acid solution. Another substance which would effect the same result by its addition is ethyl alcohol and the same is true of methyl alcohol. Both these substances have the same effect on Turnbull's blue.

What is claimed is:

1. The method of dyeing asbestos containing iron as an impurity, which consists in washing the asbestos fibers with a thirty per cent solution of concentrated acid to separate the fibers and render their surfaces receptive to a pigment, and in utilizing the iron impurity for precipitating a pigment by adding to said acid solution a soluble ferrocyanide.

2. The method of dyeing asbestos containing iron as an impurity, which consists in washing the asbestos fibers with a thirty per cent solution of concentrated hydrochloric acid to separate the fibers and render their surfaces receptive to a pigment, and in utilizing the iron impurity for precipitating a pigment by adding to said acid solution a potassium ferrocyanide.

3. The method of dyeing asbestos containing iron as an impurity, which consists in boiling the asbestos fibers in a solution of acid to separate the fibers and render their surfaces receptive to a pigment, and in utilizing the iron impurity for precipitating a pigment by adding to said acid solution a soluble ferrocyanide.

4. The method of dyeing asbestos containing iron as an impurity, which consists in boiling the asbestos fibers in a solution of hydrochloric acid to separate the fibers and render their surfaces receptive to a pigment, and in utilizing the iron impurity for precipitating a pigment by adding to said acid solution a soluble ferrocyanide.

5. The method of dyeing asbestos containing as an impurity iron in the ferric state, which consists in boiling the asbestos fibers in a solution of acid for approximately twenty minutes to separate the fibers and render their surfaces receptive to a pigment, and in utilizing the iron impurity for precipitating a pigment by adding to said acid solution a soluble ferrocyanide.

6. The method of dyeing asbestos containing iron as an impurity, which consists in treating the asbestos fibers with a solution of concentrated acid to separate the fibers and render their surfaces receptive to a pigment and in utilizing the iron impurity for precipitating a pigment by further treating the asbestos fibers with a solution containing a soluble iron cyanide.

7. The method of dyeing asbestos containing an impurity such as iron in the ferric state, which consists in boiling the asbestos fibers in a solution of acid for approximately twenty minutes to separate the fibers and render their surfaces receptive to pigment, adding a small amount of an oxidizing compound to the acid solution for oxidizing any ferrous iron present to the ferric form, and in utilizing the iron impurity for precipitating a pigment by further treating said asbestos with a soluble iron cyanide.

8. The method of dyeing asbestos containing as an impurity iron in the ferric and ferrous state, which consists in boiling the asbestos fibers in a solution of hydrochloric acid for approximately twenty minutes to separate the fibers and render their surfaces receptive to a pigment, adding nitric acid in relatively small amounts to said hydrochloric acid solution for oxidizing the ferrous iron present to the ferric form, and in precipitating said ferric iron as Prussian blue by further treating the asbestos fibers with a solution containing a soluble ferrocyanide, the nitric acid having the effect of decreasing the solubility of the Prussian blue in the hydrochloric acid solution and thereby making more color pigment available.

9. The method of dyeing asbestos containing iron in the ferric and ferrous state which consists in treating the asbestos fibers with an acid solution to separate the fibers and render the surfaces thereof receptive to a pigment, adding to said acid solution a compound for reducing all the iron present to the ferrous form, and in utilizing the iron impurity for precipitating a pigment by further treating the asbestos with a solution containing a soluble ferricyanide.

ANDERSON PACE, Jr.